(12) United States Patent
Neutgens et al.

(10) Patent No.: US 11,820,352 B2
(45) Date of Patent: Nov. 21, 2023

(54) REMOTE CAGING APPARATUS AND SYSTEM FOR BRAKES

(71) Applicants: Kurt Neutgens, Parkville, MO (US); Christopher Loo, Overland Park, KS (US)

(72) Inventors: Kurt Neutgens, Parkville, MO (US); Christopher Loo, Overland Park, KS (US)

(73) Assignee: Orange EV LLC, Kansas City, KS (US)

( * ) Notice: Subject to any disclaimer, the term of this patent is extended or adjusted under 35 U.S.C. 154(b) by 472 days.

(21) Appl. No.: 17/248,648

(22) Filed: Feb. 1, 2021

(65) Prior Publication Data

US 2021/0237697 A1    Aug. 5, 2021

Related U.S. Application Data

(60) Provisional application No. 62/967,842, filed on Jan. 30, 2020.

(51) Int. Cl.
| | | |
|---|---|---|
| *B60T 17/08* | (2006.01) | |
| *B60T 7/20* | (2006.01) | |
| *B60T 7/16* | (2006.01) | |

(52) U.S. Cl.
CPC ....... *B60T 7/20* (2013.01); *B60T 7/16* (2013.01); *B60T 17/086* (2013.01)

(58) Field of Classification Search
CPC ............. B60T 17/086; B60T 7/16; B60T 7/20

USPC ......... 92/63, 98 D, 98 R, 130 D; 188/151 R, 188/153 D, 343

See application file for complete search history.

(56) References Cited

U.S. PATENT DOCUMENTS

| | | | |
|---|---|---|---|
| 4,128,146 A | 12/1978 | Hubbard | |
| 5,560,280 A * | 10/1996 | Rumsey | ............... B60T 17/083 92/48 |
| 6,164,730 A | 12/2000 | Main | |
| 6,367,888 B1 | 4/2002 | Kee et al. | |
| 7,586,401 B2 | 9/2009 | Payne | |
| 8,463,519 B2 | 6/2013 | McCann | |
| 8,640,533 B2 | 2/2014 | Andersen | |
| 8,876,216 B2 | 11/2014 | Stewart | |
| 9,108,605 B1 | 8/2015 | Farnum et al. | |
| 9,126,644 B2 | 9/2015 | Banwart | |
| 9,283,932 B2 | 3/2016 | Bleckmann et al. | |
| 2004/0036350 A1 | 2/2004 | Rowe et al. | |
| 2007/0040353 A1 | 2/2007 | Dallaire et al. | |
| 2010/0127561 A1 | 5/2010 | Bell | |
| 2019/0202421 A1 | 7/2019 | Healy | |
| 2020/0039556 A1 | 2/2020 | Burch et al. | |
| 2020/0269822 A1* | 8/2020 | Magzimof | ............ B60T 13/662 |
| 2022/0042559 A1* | 2/2022 | Bock | ..................... F16D 55/227 |

* cited by examiner

*Primary Examiner* — Christopher P Schwartz
(74) *Attorney, Agent, or Firm* — Dunlap Bennett & Ludwig, PLLC

(57) ABSTRACT

A remote caging system and method for remote caging for semi-trailer brakes is provided. The remote caging system comprises a remote control device, and a remote caging apparatus including a transmitter/receiver. The remote caging apparatus is installed on a semi-trailer truck brake. The remote control device sends and receives signals to and from the transmitter/receiver to engage and disengage the brakes.

6 Claims, 2 Drawing Sheets

(1)

REMOTE CAGING APPARATUS AND SYSTEM FOR BRAKES

CROSS-REFERENCE TO RELATED APPLICATION

This application claims the benefit of priority of U.S. Provisional Application No. 62/967,842, filed Jan. 30, 2020, the contents of which are herein incorporated by reference in their entirety.

BACKGROUND OF THE INVENTION

The present invention relates to brakes and, more particularly, to a remote caging system for brakes.

To disengage or "cage" the brakes of a semi-trailer currently requires a person to climb under the trailer and manually perform the action, or requires the air hoses to be attached to an air compressor system, this issue is compounded when trailers are being moved in an autonomous environment.

While available methodologies to remotely operate brakes involve manipulation or control of an air compressor system, no options are available which are capable of utilizing the purely mechanical system already in place that works with or without the air compressor system functioning.

As can be seen, there is a need for a remote caging system for brakes capable of utilizing a purely mechanical system and capable of working without or without a functioning air compressor system.

SUMMARY OF THE INVENTION

Advantageously, in one aspect, the present invention provides a solution which provides a system and method for remotely caging the brakes on a semi-trailer. By attaching a mechanical device with a motor that is controlled remotely, a party can disengage the brakes on a trailer without attaching it to an air compressor system or being in close proximity to the brake cans to disengage. A remotely controlled electro-mechanical caging/uncaging device allows for the trailer brakes to be engaged/disengaged without requiring the presence of a person to either attach hoses to the trailer or physically crawl underneath the trailer and cage/uncage the brakes.

The present invention is capable of utilizing the purely mechanical system already in place that works with or without the air compressor system functioning.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION OF THE INVENTION

Figure 1:
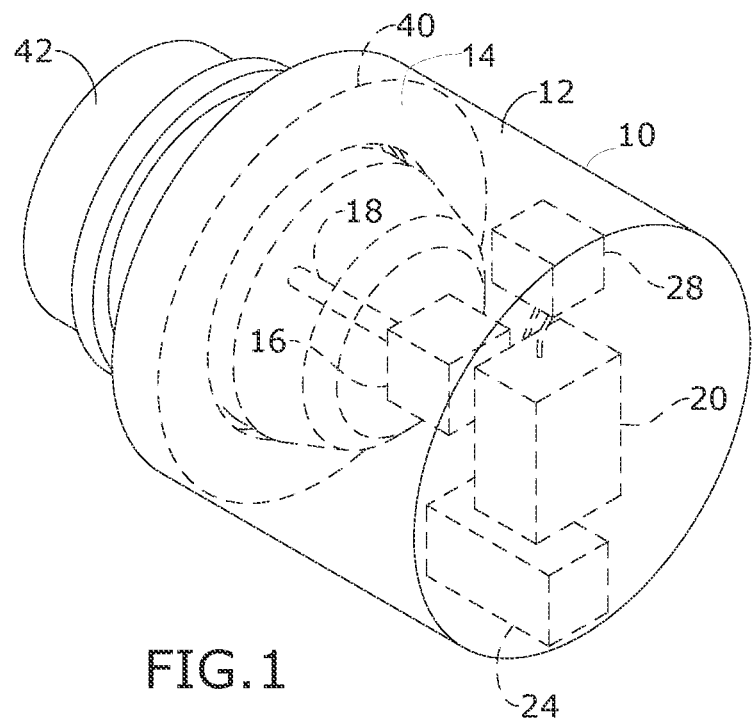
FIG. 1 is a schematic view of an exemplary embodiment of the present invention, illustrating the arrangement of components inside the case 10.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1.

Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention provides a system and method for remotely caging the brakes on a semi-trailer. By attaching a mechanical device with a motor that is controlled remotely, a party can disengage the brakes on a trailer without attaching it to an air compressor system or being in close proximity to the brake cans to disengage. A remotely controlled mechanical caging/uncaging device allows for the trailer brakes to be engaged/disengaged without requiring the presence of a person to either attach hoses to the trailer or physically crawl underneath the trailer and cage/uncage the brakes.

In an exemplary embodiment, the present invention may provide a computer-implemented remote caging system for brakes and method for its use. The system may include at least one computer or mobile computing device with a user interface. The computer may include at least one processing unit coupled to a form of memory. The computer may include, but may not be limited to, a microprocessor, a server, a desktop, laptop, and smart device, such as, a tablet and smart phone. The computer may include a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

Referring to Figures, in an exemplary embodiment of the present invention a caging apparatus 10 for a brake 42 may include one or more of the following components and combinations thereof.
- cylindrical waterproof case 12
- case flange 14
- motor 16
- motor shaft 18
- motor controller 20
- motor/controller wiring 22
- battery 24
- battery/controller wiring 26
- transmitter/receiver 28
- battery/transmitter wiring 30
- controller/transmitter wiring 32
- case/brake connection point 40
- brake connectors 44

In an exemplary embodiment of the present invention, a caging system 50 for a brake 42 may include one or more of the following components and combinations thereof.
- caging apparatus 10
- cylindrical waterproof case 12
- case flange 14
- motor 16
- motor shaft 18
- motor controller 20
- motor/controller wiring 22
- battery 24
- battery/controller wiring 26
- transmitter/receiver 28
- battery/transmitter wiring 30
- controller/transmitter wiring 32
- transmitter signal 34
- remote control 36
- remote signal 38
- case/brake connection point 40
- brake connectors 44

Figure 2:
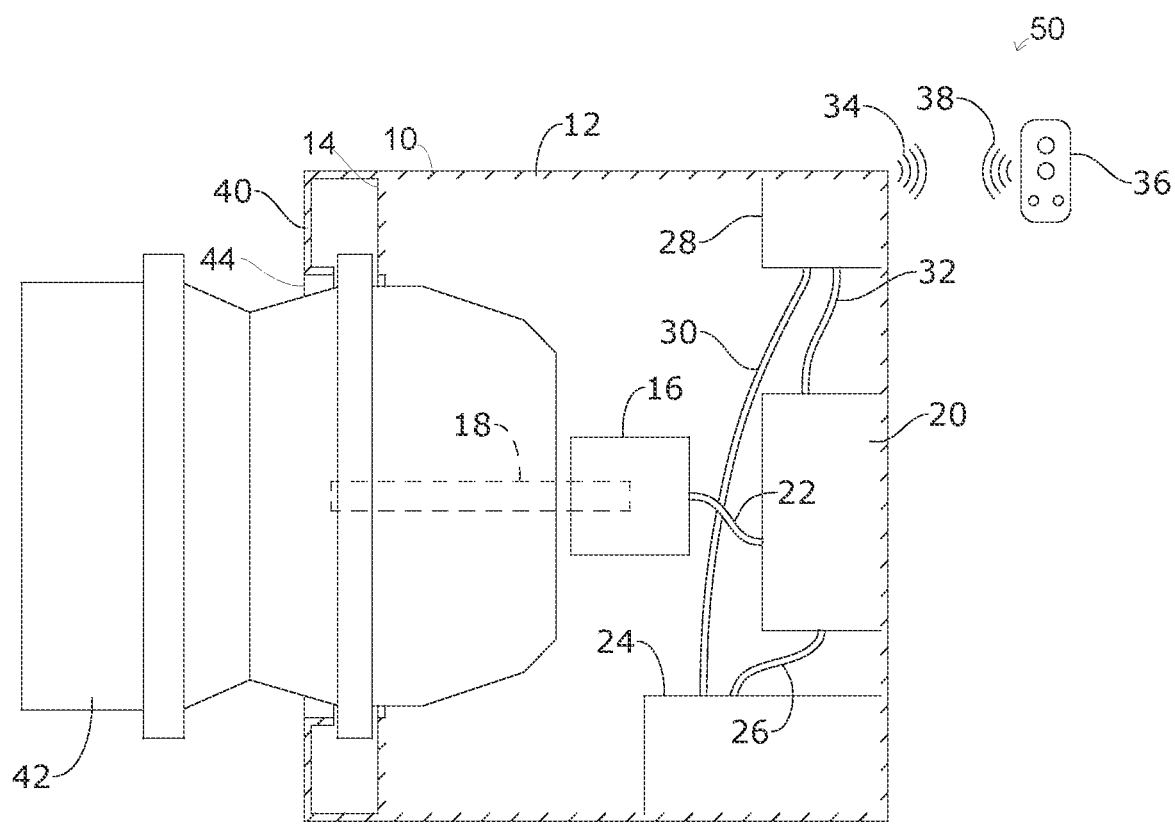
FIG. 2 is a schematic section view of an exemplary embodiment of the present invention, taken along line 2-2 in FIG. 1, with internal components shown in full for clarity.

Referring now to FIGS. 1 and 2, in an exemplary embodiment, the present invention provides a remote caging apparatus 10 and a remote caging system 50.

The caging apparatus 10 may comprise a cylindrical waterproof case 12 having a first end, and a second end. The first end is constructed and arranged to conform to an exterior shape of a brake can. The first end is open and further defines a case/brake connection point 40. The first end of the caging apparatus 10 may include a hole to allow for the screw mechanism to cage the brakes. The case 12 may include a waterproof door or waterproof charging port for battery access/charging. The case 12 may be made of any suitable material, such as, for example without limitation, metal, polymer, plastic or other durable material.

The case 12 is constructed and arranged to contain all the mechanical/electrical components that engage and disengage the trailer brakes. The case 12 shall be of sufficient size to house the mechanical works that cans the brakes. Furthermore, the case 12 includes flanges 14 or handles attached that allow for the case to be affixed to the brakes either by screwing or bolting or using straps. Such straps may be made of any suitable material, nonlimiting examples of which may include nylon or some other material that is strong and durable enough to allow for attachment to the brakes to be maintained during driving conditions.

The caging apparatus 10 may further include a motor 16. The motor is controlled through a controlling mechanism, such as, for example without limitation, a motor controller 20. The motor 16 has enough power to exert enough rotational force to cage the brake. The motor controller 20 may be operably connected to the motor 16. In some embodiments the motor 16 and motor controller may be attached. The motor controller is capable of directing the motor 16 to operate in a forward or a reverse manner.

The caging apparatus 10 may further comprise a power source. The power source may be a battery 24. Nonlimiting examples of a battery may include a rechargeable battery, a battery pack of lithium ion or some other chemistry that allows for recharging while maintaining a charge for an extended period. Furthermore, the battery 24 may be removable from the case 12 to allow for replacement and recharging.

The caging apparatus 10 may further comprise a mechanism that is constructed to engage the caging feature built into the brake can, which allows for the negating/disengaging of the brakes. Nonlimiting examples of this element may include a motor shaft 18.

The caging apparatus 10 may further comprise brake connectors 44 (best seen at FIG. 2), nonlimiting examples of which may include straps with a ratcheting securing mechanism or bolts/screws to allow for easy attachment of the entire assembly to the brake can.

As shown at FIG. 2, the present invention may further provide a caging system 50 which incorporates the caging apparatus 10 and a remote control 36. The caging apparatus 10 may include a transmitter/receiver 28 capable of communication with the remote control 36. The transmitter/receiver 28 is capable of sending a wireless signal 34 and the remote control 36 is capable of sending a wireless signal 38. Both the transmitter/receiver 28 and the remote control 36 are capable of sending or receiving a wireless signal via Wi-Fi, radio frequency or some other communication method. The transmitter/receiver 28 may interface with the motor controller 20 to operate the motor 16. The transmitter/receiver may be mounted in the cylindrical waterproof case 12, or attached thereto.

In some embodiments, the remote control may comprise or be incorporated into a computer or a mobile computing device.

The caging apparatus 10 may include insulated wires that attach the battery, the receiver, the motor controller and the motor together to allow for power to run the motor, motor controller and receiver and to allow for communication between the motor controller the receiver and the motor. The motor/controller wiring 22, the battery/controller wiring 26, the battery/transmitter wiring 30 and the controller/transmitter wiring 32 are shown at FIG. 2.

The case 12 contains all the mechanical/electrical components that engage and disengage the trailer brakes. The motor shaft engagement mechanism 18, is placed within the brake housing and fitted within the brake housing in a manner that enables it to engage and disengage the brake by moving in and out. The case 12 is firmly against the brake can. The case 12 is secured to the brakes by a securement element 44, such as, for example without limitation, a set of straps 44 or bolts 44. The remote control 36 sends and/or receives a signal to/from the transmitter/receiver 28 to either engage or disengage the brakes. The receiver 28 then provides the engage or disengage command to the motor controller 20. The motor controller 20 then turns on the motor 16 to either engage or disengage the brake. The motor 16 then either tightens or loosens the engagement mechanism 18.

The battery/battery pack 24 is connected to the receiver 28 by insulated battery/transmitter wiring 30. The battery/battery pack 24 is connected to the motor controller 20 with insulated battery/controller wiring 26. The receiver 28 and the motor controller 20 are connected by insulated controller/transmitter/receiver wiring 32 to allow the receiver 28 to direct the motor controller 20 to engage or disengage the brake. The motor controller 20 and the motor 16 are connected by insulated wires 22 to allow the motor controller 20 to direct the motor 26 to engage or disengage the brake. The motor 16 and the motor controller 20 may be attached to each other, or may be separate components.

Figure 3:
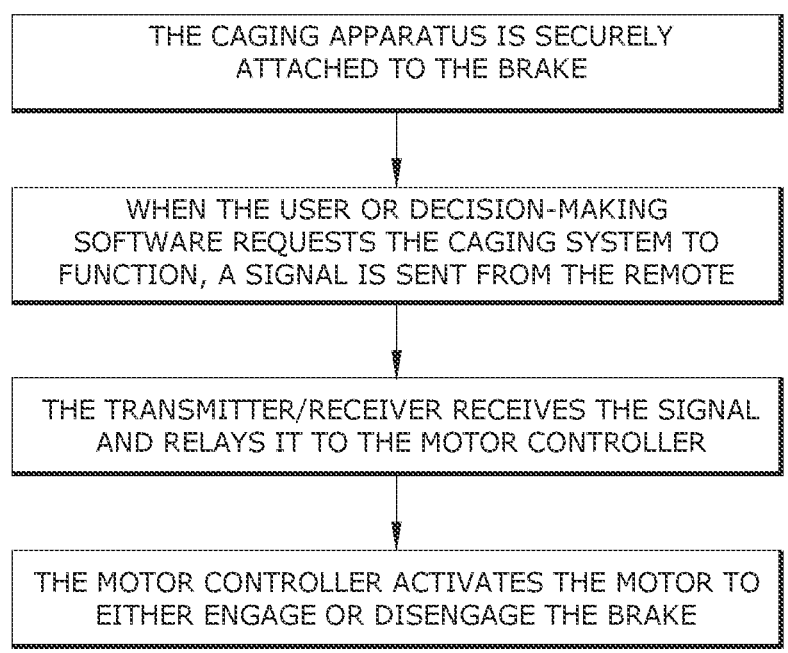
FIG. 3 is a flow chart of a method in accordance with an exemplary embodiment of the present invention.

In an exemplary embodiment the present invention may provide a remote caging method for brakes. Referring to FIG. 3, the method may include one or more of the following steps and combinations thereof. First, the caging apparatus or unit 10 is securely attached to the brake. Next, when the user or decision-making software requests the caging apparatus or caging system to function, a signal is sent from the remote control. Then, the transmitter/receiver receives the signal and relays it to the motor controller. In response, the motor controller activates the motor to either engage or disengage the brake.

In an exemplary embodiment a method for use of the system with the brakes of a semi-trailer truck is provided. The caging apparatus or unit 10 is attached securely to the brake can, ensuring the engagement mechanism 18 is correctly connected to the brake spring. The caging apparatus or unit is secured by straps or bolts. Then the remote control is used to either engage or disengage the trailer's brake. The remote controller sends a signal to the caging unit when the decision-making software or person requests the caging unit to function. The transmitter/receiver relays that signal to the motor controller, which activates the motor and engages the caging mechanism to either engage or disengage the trailer brakes. All activities in the caging unit may be powered by the rechargeable battery.

A method of making the present invention may include the following. Assemble the unit detailed herein with a battery connected to the system with insulated wires. The transmitter/receiver and the motor controller are connected by insulated wires to allow the transmitter/receiver to direct the motor controller to engage or disengage the brake. The motor controller and the motor are connected by insulated wires to allow the motor controller to direct the motor to engage or disengage the brake. The remote controller is located remotely and can be integrated into a larger system that may be utilized for autonomous operation of the unit. The case is fabricated to securely fit each piece of the unit and of a diameter fit against the brake can of the trailer and allow for attachment to the trailer via straps or bolts/screws.

In an exemplary embodiment, the present invention provides a mobile and computer-implemented remote caging system and method. The system may include all of the features described herein. The system remote control device may be incorporated into a computer or mobile computing device. The present invention may also comprise software built to be able to complete the requisite tasks and provide the user with the useful tool described above.

In summary, the present invention provides a remote caging system and method for remote caging for semi-trailer brakes. The remote caging system comprises a remote caging apparatus and a remote control device.

The remote caging apparatus comprises:
a cylindrical waterproof case constructed and arranged for installation on a semi-trailer truck brake; the case comprising a housing and having an exterior surface, a first end comprising a circular opening defining a case/brake connection point, the first end constructed and arranged to conform to the exterior shape of a brake can, a cylindrical side wall and a planar second end, the cylindrical side wall and planar second end defining a case interior portion or housing interior;
a case flange adjacent the first end of the case;
at least one brake connector;
a motor located in the housing;
a motor shaft engagement mechanism located in the housing, the motor shaft being constructed and arranged to engage and disengage the brake by moving in and out;
a motor controller located in the housing;
an insulated motor/controller wire located in the housing;
a battery removably located in the housing;
an insulated battery/controller wire located in the housing;
a transmitter/receiver located in the housing;
an insulated battery/transmitter wire located in the housing; and
an insulated controller/transmitter wire located in the housing.

The remote control device is capable of sending and receiving signals to and from the transmitter/receiver to engage and disengage the brakes.

The battery is connected to the receiver by the insulated battery/transmitter wire. The battery is also connected to the motor controller by the insulated battery/controller wire. The receiver and the motor controller are connected by the insulated controller/transmitter/receiver wire to allow the receiver to direct the motor controller to engage or disengage the brake. The motor controller and the motor are connected by the insulated motor/controller wire to allow the motor controller to direct the motor to engage or disengage the brake.

When the remote control device sends a signal to the transmitter/receiver to engage or disengage the brakes, the receiver then provides the engage or disengage command to the motor controller, the motor controller then turns on the motor to engage or disengage the brake and the motor then either tightens or loosens the motor shaft engagement mechanism and the brake is either engaged or disengaged.

In some embodiments, the case is made of durable material selected from carbon, metal, polymer, plastic or combinations thereof.

In some embodiments, the motor is controlled by the motor controller, the motor controller being capable of directing the motor to operate in a forward or reverse manner, the motor providing enough power to exert sufficient rotational force to cage the brake.

In some embodiments, the battery may be selected from a rechargeable battery capable of maintaining a charge for an extended time period; a removable battery; a replaceable battery; a battery pack; and combinations thereof.

In some embodiments, the remote control and transmitter/receiver are capable of sending and receiving a wireless signals from each other by Wi-Fi.

The present invention provides a remote caging method comprising the steps of:
providing a remote caging system as described herein, including a caging apparatus and a remote control device on which a caging system software is installed, the system software including a decision-making system software component;

installing the apparatus on a brake of a semi-trailer truck by securely attaching the apparatus to the brake;

providing a request made by a user or the decision-making system software component for the caging apparatus to function;

sending a first signal from the remote control;

receiving the first signal by the transmitter/receiver;

relaying the first signal from the transmitter/receiver to the motor controller;

in response to the first signal received by the motor controller, the motor controller activating the motor to either engage or disengage the brake.

The remote caging apparatus and system of the present invention is cap able of utilizing the purely mechanical system already in place that is able to work with or without the air compressor system functioning.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications, variations and changes in detail may be made without departing from the spirit and scope of the invention as set forth in the following claims.

What is claimed is:

1. A remote caging system comprising:
   (a) a caging apparatus for a brake, the caging apparatus comprising:
      (i) a cylindrical waterproof case constructed and arranged for installation on a semi-trailer truck brake; the case comprising a housing and having an exterior surface, a first end comprising a circular opening defining a case/brake connection point, the first end constructed and arranged to conform to the exterior shape of a brake can, a cylindrical side wall and a planar second end, the cylindrical side wall and planar second end defining a case interior portion or housing interior;
      (ii) a case flange adjacent the first end of the case;
      (iii) at least one brake connector;
      (iv) a motor located in the housing;
      (v) a motor shaft engagement mechanism located in the housing, the motor shaft being constructed and arranged to engage and disengage the brake by moving in and out;
      (vi) a motor controller located in the housing;
      (vii) an insulated motor/controller wire located in the housing;
      (viii) a battery removably located in the housing;
      (ix) an insulated battery/controller wire located in the housing;
      (x) a transmitter/receiver located in the housing;
      (xi) an insulated battery/transmitter wire located in the housing; and
      (xii) an insulated controller/transmitter wire located in the housing; and
   (b) a remote control device capable of sending and receiving signals to and from the transmitter/receiver to engage and disengage the brakes;
   wherein the battery is connected to the receiver by the insulated battery/transmitter wire, the battery is connected to the motor controller by the insulated battery/controller wire, the receiver and the motor controller are connected by the insulated controller//transmitter/receiver wire to allow the receiver to direct the motor controller to engage or disengage the brake; the motor controller and the motor are connected by the insulated motor/controller wire to allow the motor controller to direct the motor to engage or disengage the brake;
   whereby, when the remote control device sends a signal to the transmitter/receiver to engage or disengage the brakes, the receiver then provides the engage or disengage command to the motor controller, the motor controller then turns on the motor to engage or disengage the brake and the motor then either tightens or loosens the motor shaft engagement mechanism and the brake is either engaged or disengaged.

2. The remote caging system of claim 1 wherein the case is made of durable material selected from carbon, metal, polymer, plastic or combinations thereof.

3. The remote caging system of claim 1 wherein the motor is controlled by the motor controller, the motor controller being capable of directing the motor to operate in a forward or reverse manner, the motor providing enough power to exert sufficient rotational force to cage the brake.

4. The remote caging system of claim 1, wherein the battery may be selected from a rechargeable battery capable of maintaining a charge for an extended time period; a removable battery; a replaceable battery; a battery pack; and combinations thereof.

5. The remote caging system of claim 1 wherein the remote control and transmitter/receiver are capable of sending and receiving a wireless signals from each other by Wi-Fi.

6. A remote caging method comprising the steps of:
   providing a remote caging system as in claim 1, including a caging apparatus and a remote control device on which a caging system software is installed, the system software including a decision-making system software component;
   installing the apparatus on a brake of a semi-trailer truck by securely attaching the apparatus to the brake;
   providing a request made by a user or the decision-making system software component for the caging apparatus to function;
   sending a first signal from the remote control;

receiving the first signal by the transmitter/receiver;
relaying the first signal from the transmitter/receiver to the motor controller;
in response to the first signal received by the motor controller, the motor controller activating the motor to either engage or disengage the brake.

\* \* \* \* \*